(12) United States Patent
Chibon et al.

(10) Patent No.: US 12,081,614 B2
(45) Date of Patent: Sep. 3, 2024

(54) CHUNKED FILE TRANSFER AMONG MOBILE PEER DEVICES

(71) Applicant: Red Hat, Inc., Raleigh, NC (US)

(72) Inventors: Pierre-Yves Chibon, Saint-pol-de-Léon (FR); Leigh Griffin, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 21 days.

(21) Appl. No.: 17/694,232

(22) Filed: Mar. 14, 2022

(65) Prior Publication Data

US 2023/0291787 A1 Sep. 14, 2023

(51) Int. Cl.
G06F 15/173 (2006.01)
H04L 67/06 (2022.01)
H04L 67/52 (2022.01)

(52) U.S. Cl.
CPC .............. *H04L 67/06* (2013.01); *H04L 67/52* (2022.05)

(58) Field of Classification Search
CPC ................................ H04L 67/06; H04L 67/52
See application file for complete search history.

(56) References Cited

U.S. PATENT DOCUMENTS

| 6,832,373 | B2* | 12/2004 | O'Neill | G06F 8/65 |
| | | | | 714/25 |
| 2016/0142862 | A1* | 5/2016 | Coenen | H04W 4/80 |
| | | | | 455/41.1 |
| 2017/0086103 | A1 | 3/2017 | Neves et al. | |
| 2018/0132131 | A1 | 5/2018 | Mather et al. | |
| 2018/0278708 | A1* | 9/2018 | Ishihara | H04L 67/60 |
| 2019/0058963 | A1 | 2/2019 | Yu et al. | |
| 2020/0401391 | A1 | 12/2020 | Ucar | |
| 2021/0067595 | A1* | 3/2021 | Gum | H04W 4/029 |
| 2021/0337365 | A1 | 10/2021 | Esselink et al. | |
| 2022/0303331 | A1* | 9/2022 | Svennebring | H04N 21/44209 |

OTHER PUBLICATIONS

Rajarajan Narayanasamy (GB2573010A; Peer to Peer communication system) (Year: 2019).*
Extended European Search Report from related EP Application No. 22168383.2 mailed on Sep. 16, 2022, 9 pages.

* cited by examiner

*Primary Examiner* — Yves Dalencourt
(74) *Attorney, Agent, or Firm* — Womble Bond Dickinson (US) LLP

(57) ABSTRACT

Techniques for peer to peer sharing of files in a mobile environment are provided. In response to coming within communication range of a second device, a processing device may determine whether the second device will remain in communication range with a first device for at least a threshold amount of time. An amount of data that can be transferred between the first and second devices during a transfer window with the second device may be determined. Package manifests of the first and second devices may be compared to determine a set of packages of the first device that need to be updated. A number of chunks for a first package of the set of packages may be received from the second device, the number of chunks based on the amount of data that can be transferred between the first and second devices during the transfer window.

20 Claims, 9 Drawing Sheets

CHUNKED FILE TRANSFER AMONG MOBILE PEER DEVICES

TECHNICAL FIELD

Aspects of the present disclosure relate to peer to peer transfer of files (e.g., packages, firmware updates), and more particularly, to peer to peer transfer of files in environments where peer devices may be mobile and/or in communication for limited periods of time.

BACKGROUND

A chunked file transfer service (CFTS), also referred to as chunked file encoding is a streaming data transfer mechanism in which a data stream is divided into a series of non-overlapping "chunks." Each of the chunks is sent out and received independently of one another. No knowledge of the data stream outside the currently-being-processed chunk is necessary for both the sender and the receiver at any given time. CFTSs can be used in environments such as mobile internet of things (IoT) domains where a fleet of IoT devices that share the same configuration, policies, and identity stores may wish to share various packages and updates thereto with each other.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1A:
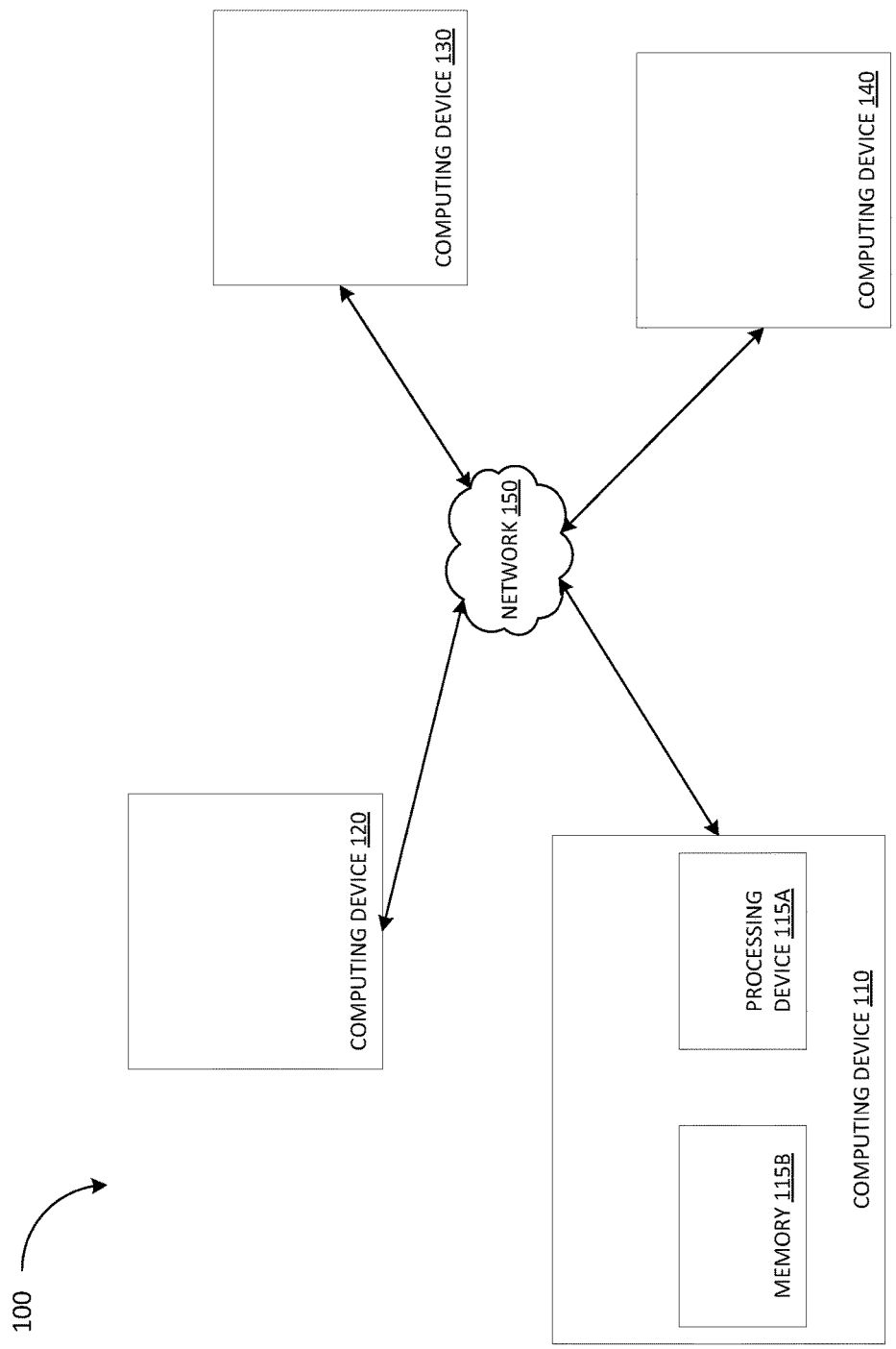
FIG. 1A is a block diagram that illustrates an example system, in accordance with some embodiments of the present disclosure.

Devices in e.g., mobile IoT environments may include a package manager which, when an outbound internet connection (or other appropriate connection) to a package repository (e.g., an RPM or Yum repository) is available, may infer the latest version of a package running on the respective device and pull a corresponding update from the package repository. However, such an outbound connection may not be readily and/or consistently available in an environment where each of the devices are in motion (e.g., a vehicle on the road).

File transfer on devices that are in motion and require peer to peer communication to receive files/updates can be difficult as the devices may not be in the same physical space (e.g., within communication range of each other) for long enough to complete the transfer of required files. One example of such a scenario involves vehicles in motion on the road, where the vehicles are moving at a relatively high speed and thus have a narrow window within which to facilitate a transfer of files. This problem can be exacerbated when the devices are bandwidth constrained (e.g., because they are so actively used) either in time or in speed as well as constrained with respect to computational resources (computational bandwidth). In addition, certain packages may be frequently updated (e.g., with patch updates, bug fixes, etc.) causing the software on devices in such scenarios to become out of date rapidly.

The present disclosure addresses the above-noted and other deficiencies by providing techniques for peer to peer sharing of files in a mobile environment using CFTS. More specifically, embodiments of the present disclosure may utilize a processing device to, in response to coming within communication range of a second device, determine whether a second device will remain in communication range with a first device for at least a threshold amount of time. This determination may be made based on the speed and direction of both computing devices. In response to determining that the second device will remain in communication range with the first device for at least the threshold amount of time, an amount of data that can be transferred from the second device to the first device during a minimum amount of time the second device will remain in communication range with the first device may be determined. This determination may be made on the available communication bandwidth and the available computational bandwidth of each of the first and second devices. A package manifest of the first device may be compared with a package manifest of the second device to determine a set of packages of the first device that need to be updated. A number of chunks for a first package of the set of packages of the first device may be received from the second device, the number of chunks based on the amount of data that can be transferred from the second device to the first device during the minimum amount of time. Unlike normal windowing techniques, embodiments of the present disclosure provide dynamic computation of chunk size not just based on bandwidth, but also speed and direction to determine when two computing devices will no longer be in communication range and what can be transferred before that time.

FIG. 1 is a block diagram that illustrates an example system 100. As illustrated in FIG. 1, the system 100 includes computing devices 110, 120, 130, and 140. The computing devices 110-140 may be coupled to each other (e.g., may be operatively coupled, communicatively coupled, may communicate data/messages with each other) via network 150. Network 150 may be a public network (e.g., the internet), a private network (e.g., a local area network (LAN) or wide area network (WAN)), or a combination thereof. In one embodiment, network 150 may include a wired or a wireless infrastructure, which may be provided by one or more wireless communications systems, such as a WiFi™ hotspot connected with the network 150 and/or a wireless carrier system that can be implemented using various data processing equipment, communication towers (e.g. cell towers), etc. The network 150 may carry communications (e.g., data, message, packets, frames, etc.) between the computing devices 110-140. Each of the computing devices 110-140 may include hardware such as processing device 115A (e.g., processors, central processing units (CPUs), memory 115B (e.g., random access memory (RAM), storage devices (e.g., hard-disk drive (HDD), solid-state drive (SSD), etc.), and other hardware devices (e.g., sound card, video card, etc.). A storage device may comprise a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. The memory 115B (as well as the corresponding memory of each of the computing devices 120-140) may include a peer to peer chunked file transfer software module (not shown) which may be executed by the processing device 115A to perform certain functions described herein.

FIG. 1 and the other figures may use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral.

Each of the computing devices 110-140 may comprise any suitable type of computing device or machine that has a programmable processor including, for example, server computers, desktop computers, laptop computers, tablet computers, smartphones, set-top boxes, vehicles etc. In some examples, the computing devices 110-140 may comprise a single machine or may include multiple interconnected machines (e.g., multiple servers configured in a cluster). The computing devices 110-140 may be implemented by a common entity/organization or may be implemented by different entities/organizations. For example, computing device 120 may be operated by a first company/corporation while computing device 130 may be operated by a second company/corporation. The computing devices 110-140 may each execute or include an operating system (OS) (not shown in the FIGS.), as discussed in more detail below. The OSs of computing devices 110-140 may manage the execution of other components (e.g., software, applications, etc.) and/or may manage access to the hardware (e.g., processors, memory, storage devices etc.) of their respective computing device.

In some embodiments, the computing devices 110-140 may form a domain. A domain may include of a group of devices that share the same configuration, policies, and identity stores. The shared properties allow the devices within the domain to be aware of each other and operate together. The computing devices 110-140 may all be individual devices that are a part of a domain representing e.g., a fleet of internet of things (IoT) devices.

As discussed herein, the computing devices 110-140 may represent a variety of different devices in any of a variety of scenarios. Although embodiments of the present disclosure are described with respect to each of the computing devices 110-140 being a vehicle on the road (and the system 100 representing a networked set of vehicles), each of the computing devices 110-140 may represent any appropriate devices in any appropriate setting/scenario. For example, each of the computing devices 110-140 may represent a smart phone (or other mobile computing device) in an office setting.

Figure 1B:
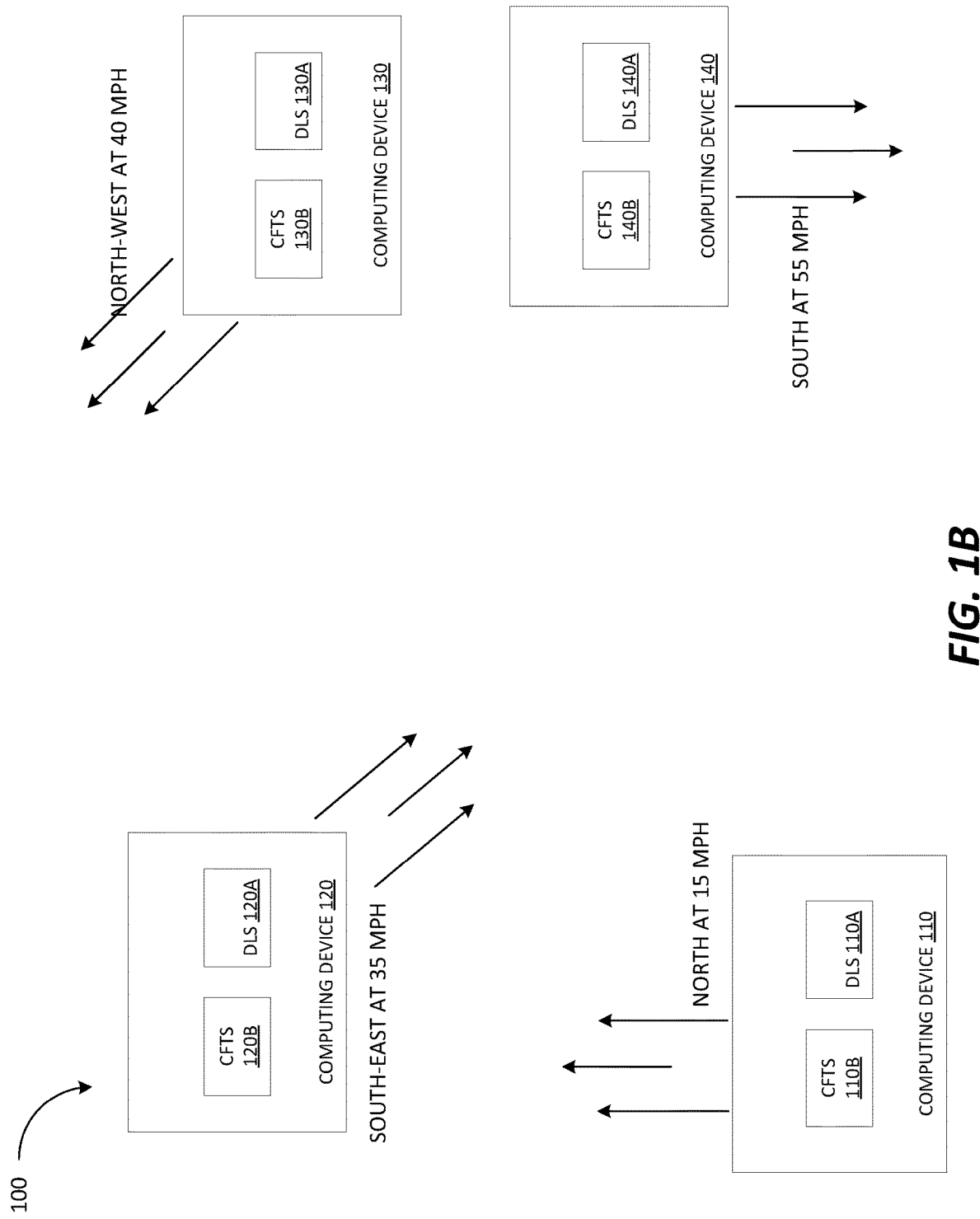
FIG. 1B is a block diagram that illustrates an example system in which the devices of the system are in motion, in accordance with some embodiments of the present disclosure.

FIG. 1B illustrates the system 100 in accordance with embodiments of the present disclosure which facilitate device to device transmission and sharing of files. Each of the computing devices 110-140 may run a respective CFTS 110B-140B which may divide a file (e.g., a package or a firmware update) into chunks of defined size and may store and rebuild files that have been divided into chunks. Each of the computing devices 110-140 may also run a respective service called a device manifest list (DLS) 110A-140A which may maintain a list of packages and the version of each package running on the computing device (hereinafter referred to as a package manifest). When an outbound internet connection (or other appropriate connection) to a package repository is available to a computing device, the DLS of that computing device may infer the latest version of a package running on the computing device and pull the update from the package repository. However, such an outbound connection may rarely be available in a scenario wherein each of the computing devices 110-140 comprises a vehicle on the road, and thus the DLS of the computing device may not be able to rely on sourcing packages and updates for packages from the package repository in such scenarios.

As can be seen in FIG. 1B, each of the computing devices 110-140 (vehicles) is in motion at different directions and speeds. As two computing devices (e.g., 110 and 120) approach each other, they may enter communication range. Communication range may be defined as the range within which two computing devices can discover each other, open a communication channel between each other, and exchange data (e.g., first, a respective DLS of each computing device may compare their package manifests, then subsequently each computing device may use a CFTS to exchange files with each other based on the comparison of their package manifests, as discussed in further detail herein).

Upon entering communication range with each other, the computing devices 110 and 120 may engage in a handshaking procedure. The handshaking procedure enables the computing devices 110 and 120 to determine if they will remain in communication range long enough based on a predefined threshold amount of time (hereinafter referred to as the "communication range duration threshold") to exchange an appreciable amount of data. An appreciable amount of data (and thus, the communication range duration threshold) may be based on a number of factors. For example, the computing devices of system 100 may not wish to engage in any data transfer activity if they cannot at least compare package manifests and determine whether one of the computing devices is running out of date packages, or if they cannot compare package manifests, determine whether one of the computing devices is running out of date packages, and transfer a certain number of chunks of packages within the time the computing devices will be in communication range. Thus, the communication range duration threshold may be set based on the amount of time required to compare package manifests and determine whether one of the computing devices is running out of date packages (i.e., an appreciable amount of data).

As part of the handshaking procedure, each of the computing devices 110 and 120 may inform the other of its speed and direction. In some embodiments, each of the computing devices 110 and 120 may also inform the other of their available communication bandwidth (as discussed in further detail herein). Each of the computing devices 110 and 120 may obtain their respective speed/direction/bandwidth information from on-board diagnostics/telemetry hardware/software. Because one or both of the computing devices 110 and 120 could suddenly accelerate and/or change direction, it is difficult to know the actual amount of time the computing devices 110 and 120 will remain in communication range. Thus, each of the computing devices 110 and 120 may determine a minimum amount of time they will be in communication range based on their current speed and direction and determine whether the minimum amount of time they will be in communication range is at or above the communication range duration threshold. If the computing devices 110 and 120 will not remain in communication range for at least the threshold amount of time, they will not engage in further communication (i.e., will not proceed to compare packages or transfer any chunks or portions thereof).

In some embodiments, each of the computing devices 110 and 120 may also account for the available communication bandwidth of the other computing device when determining whether to proceed with further communication. For example, if computing device 110 determines that it will remain in communication range with computing device 120 for at least the communication range duration threshold amount of time, but that the available bandwidth of computing device 120 is too low to allow for exchange of an appreciable amount of data, then it may refrain from engaging in further communication with computing device 120.

Upon determining that the minimum amount of time the computing devices 110 and 120 will remain in communication range is at or above the communication range duration threshold amount of time, the CFTS 110B and 120B of computing devices 110 and 120 respectively may determine how much data can be transferred in the window corresponding to the minimum amount of time the computing devices 110 and 120 will be in communication range (hereinafter referred to as the transfer window) based on the available communication bandwidth and computational bandwidth. Each of the computing devices 110 and 120 (via the CFTS 110B and 120B respectively) may share information regarding the available bandwidth of the various communication links that are available to them so as to utilize the highest bandwidth link available to both computing devices. For example, computing device 110 may have multiple communication links including a Bluetooth link, and may determine (e.g., from polling on-board diagnostics hardware/software) that its Bluetooth link is the highest bandwidth link available. However, the Bluetooth link on computing device 120 may be turned off (or may have little to no available bandwidth). In this way, the computing devices 110 and 120 may compare available bandwidth of each of their communication links to determine the available communication bandwidth based on the highest bandwidth link that is available to both of them. There are a number of factors that can affect the available bandwidth including e.g., one or more of the computing devices not being 5G enabled (e.g., not having a 5G communication link), a Wifi™ chip of one or more devices being non-operational, one or more devices going through a cellular coverage black spot, and certain communication links of one or more devices being extensively utilized for other purposes, among others.

In addition, each computing device 110 and 120 (via the CFTS 110B and 120B respectively) may provide information on their available computational bandwidth, which may also be subject to a number of considerations. For example, computing device 110 may have navigation software running and thus be CPU constrained, limiting the amount of CPU resources it can provide to transfer data. Based on the available communication bandwidth and the available computational bandwidth, the computing devices 110 and 120 may determine the amount of data that they can transfer within the transfer window.

Upon determining the amount of data that can be transferred, the respective DLS 110A and 120A of each computing device 110 and 120 may compare their package manifests and determine if any packages they are executing are out of date. More specifically, each DLS 110A and 120A may compare their package manifests to identify common packages. For each package that is common to both computing devices 110 and 120, the respective DLS may then calculate a difference between the version running on their respective computing device and the version running on the other computing device to determine any difference in version and whether they are running out of date versions of those packages.

Figure 2A:
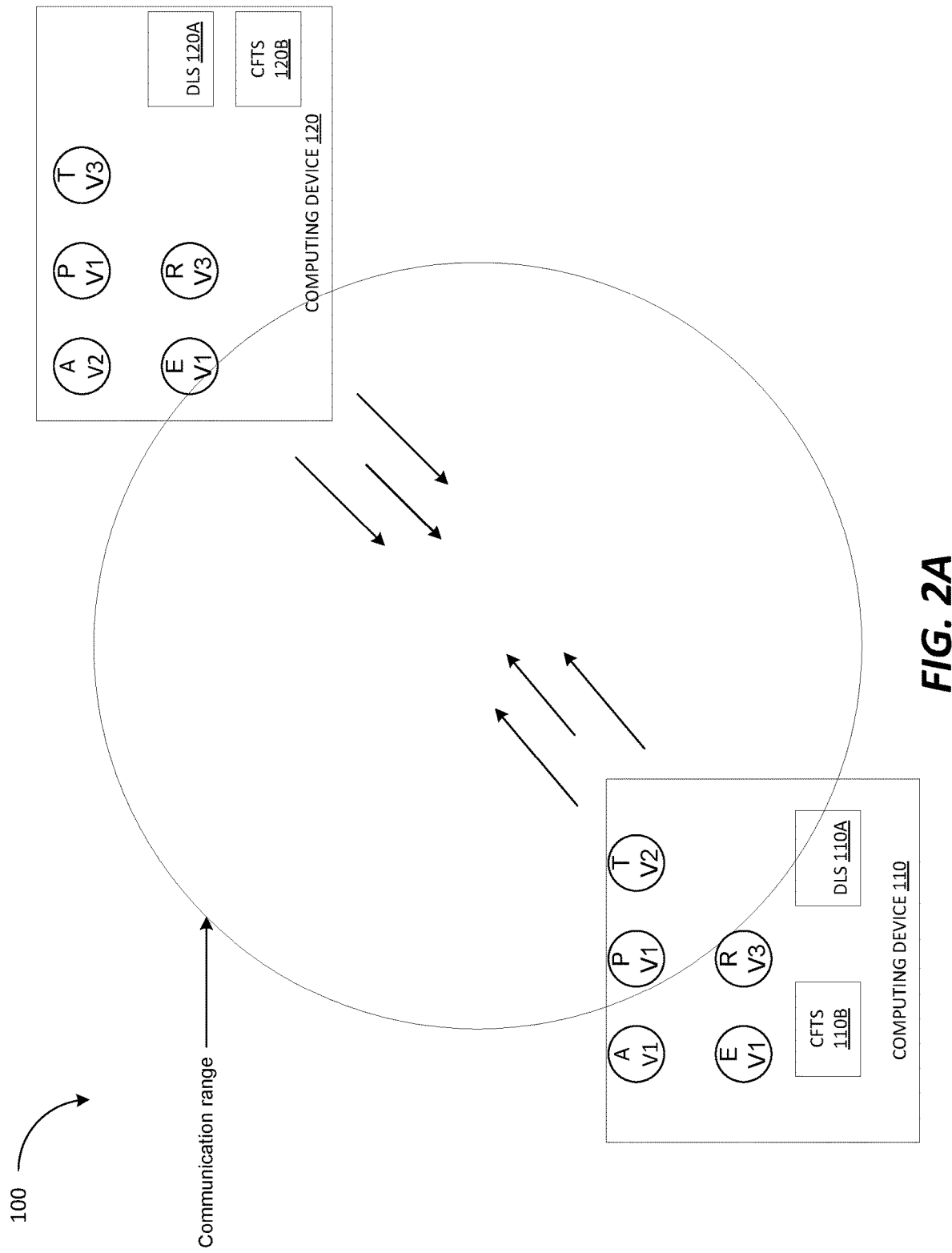
FIG. 2A is a block diagram that illustrates peer to peer chunked file transfer between two devices in motion, in accordance with some embodiments of the present disclosure.
Figure 2B:
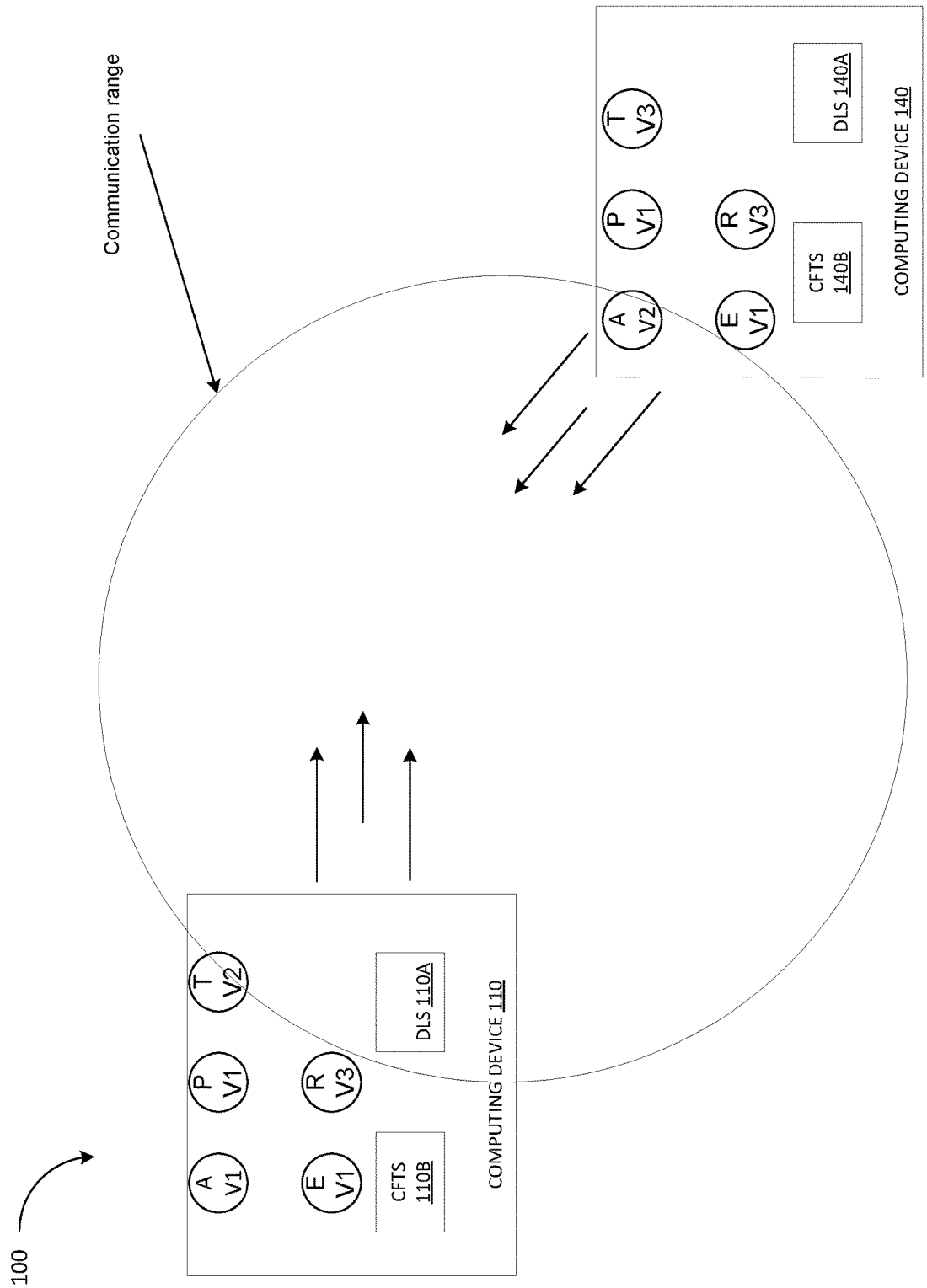
FIG. 2B is a block diagram that illustrates peer to peer chunked file transfer between two devices in motion, in accordance with some embodiments of the present disclosure
Figure 2C:
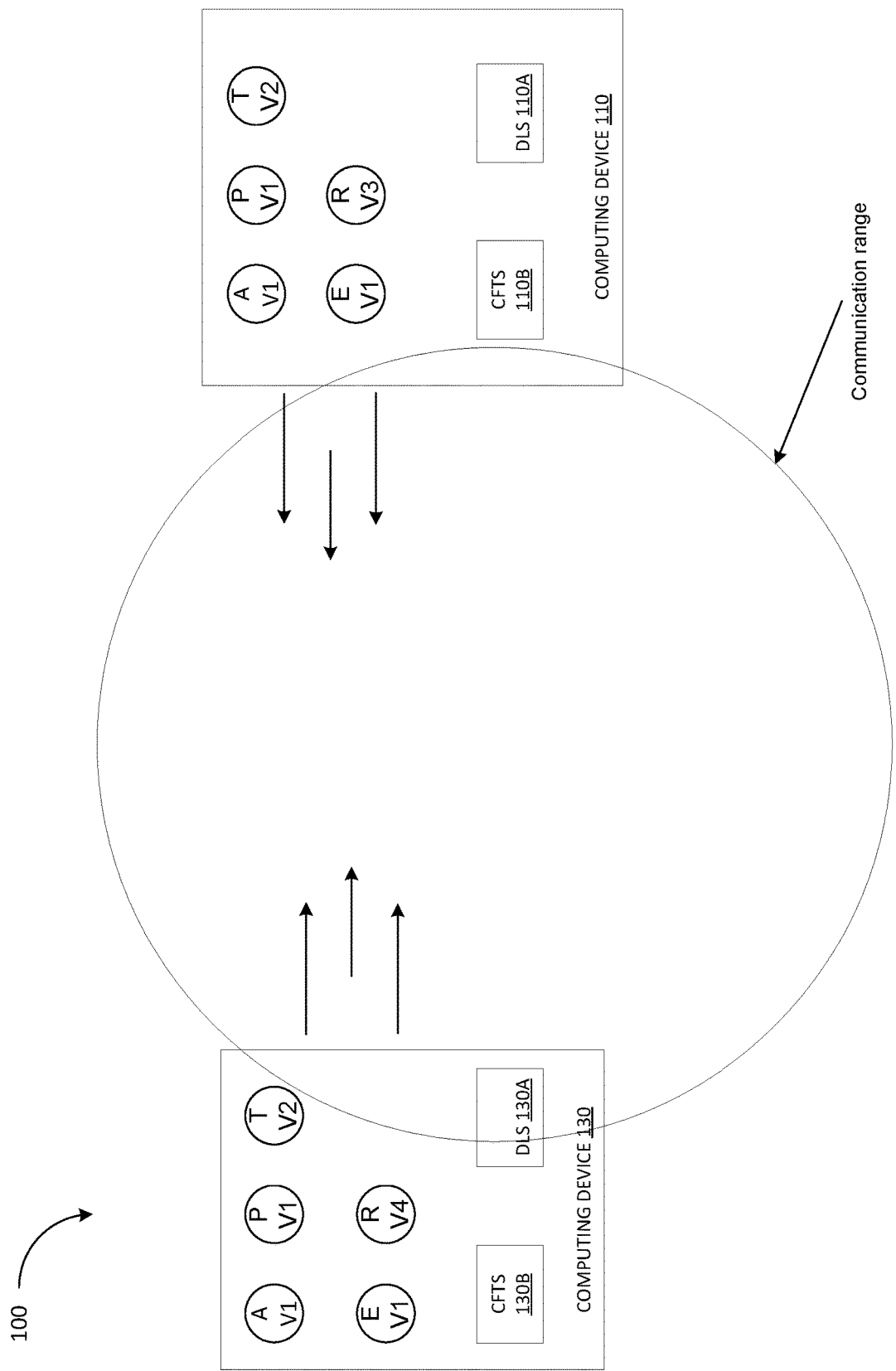
FIG. 2C is a block diagram that illustrates peer to peer chunked file transfer between two devices in motion, in accordance with some embodiments of the present disclosure

FIGS. 2A-2C illustrates an example of device to device transmission and sharing of files in accordance with embodiments of the present disclosure. As shown in FIG. 2A, computing devices 110 and 120 may be approaching each other while driving in opposite directions on a road. FIG. 2A also illustrates the packages A, P, T, E, and R that the (host OS of) computing device 110 includes and the version number of each, as well as the packages A, P, T, E, and R that the (host OS of) computing device 120 includes and the version number of each. As computing device 110 and 120 approach each other, they may enter communication range and execute the handshaking procedure discussed herein. More specifically, computing device 110 may inform computing device 120 that it is travelling at 10 miles per hour (MPH) in the north-east direction, and receive an indication from computing device 120 that it is travelling at 15 MPH in the south-west direction. Based on this information, the computing device 110 may determine that the minimum amount of time it will be in communication range with computing device 120 (transfer window) is four seconds. In the example of FIGS. 2A-2C, the communication range duration threshold may be 2.5 seconds, and thus computing device 110 may determine that because the transfer window exceeds the communication range duration threshold, it will be in communication range with computing device 120 for enough time to exchange an appreciable amount of data.

Computing device 110 may then determine (via its CFTS 110A) how much data can be transferred in the four second transfer window based on the available communication bandwidth and computational bandwidth as discussed herein. With respect to communication bandwidth, the computing device 110 may share bandwidth information about each of its available communication links. In the example of FIGS. 2A-2C, the Bluetooth communication link of computing device 110 may currently be utilized for media streaming and thus may not have significant available bandwidth while the 5G link of computing device 110 may have significant available bandwidth. Thus, computing device 110 may transmit an indication that its Bluetooth link has limited bandwidth and indicate the available bandwidth/transfer speed thereof, and that its 5G communication link (provided by e.g., a 5G communication chip) has significant available bandwidth (e.g., 80%) and indicate the available bandwidth/transfer speed thereof. Thus, if computing device 110 has a maximum transfer speed of 10 Gb/s via its 5G communication link, it may currently be able to transfer files at 8 Gb/s using its 5G communication link (as opposed to 10 Gb/s if it had 100% of its 5G communication link's available bandwidth). Computing device 110 may receive from computing device 120 an indication that all of computing device 120's communication links (including 5G and Bluetooth) have significant available bandwidth (e.g., 80% or more) and the available bandwidth of each. Thus, the computing device 110 may determine that the 5G communication link is the most suitable/provides the highest bandwidth and select it for use in comparing files/transferring chunks.

The computing device 110 may also determine its computational bandwidth based on its current computational load. In the example of FIGS. 2A-2C, the computing device 110 may be currently running navigation software while also facilitating media streaming services. Thus, the computing device 110 may determine that it has fifty percent of its computational bandwidth available and may provide this information to computing device 120. Computing device 110 may also receive from computing device 120 an indication that it has one hundred percent of its computational bandwidth available. Based on the available communication bandwidth and the available computational bandwidth, the computing devices 110 and 120 may determine the amount of data that they can exchange within the four second transfer window. In the example of FIG. 2A, the computing device 110 (via CFTS 110B) may determine that it can exchange 2 megabytes (MB) of data, which is sufficient to compare its package manifest as well as receive 1.8 MB worth of chunks during the four second transfer window.

Because the DLS 110A of computing device 110 is currently unaware that it has packages that are out of date, upon determining the amount of data that can be transferred during the transfer window, computing device 110 may utilize its respective DLS 110A to compare its package manifest with the package manifest of DLS 120A and determine if any packages it is executing are not the latest version of that package. As shown in FIG. 2A, the DLS 110A may determine that it is running out of date versions of packages A and T as it is running versions 1 and 2 of those packages respectively while computing device 120 is running versions 2 and 3 of those packages respectively. In some embodiments, the DLS 110A may only compare its package manifest with that of another computing device when it is unaware that it has packages that are out of date.

It should be noted that in some scenarios, the computing device 110 may determine that it can only transfer enough data during the transfer window to compare package manifests and determine whether any packages it is running are out of date. In such scenarios, the computing device 110 (via the DLS 110A) may still compare package manifests and determine whether any packages it is running are out of date. In this way, the computing device 110 may prevent the need to perform the package manifest comparison process via it comes into communication range with a subsequent computing device (because the computing device 110 is now aware that it has packages that are out of date). For example, upon entering into communication range with a subsequent computing device, the computing device 110 (upon completing the handshaking process) may directly request the packages/versions it has determined that it requires based on its previous package manifest comparison with DLS 120A of computing device 120. In this way, the computing device 110 may dedicate all data that can be transferred (during the transfer window with that subsequent computing device) to the transfer of chunks corresponding to packages/versions that it requires.

If the subsequent computing device in question has any of the packages/versions computing device 110 requires, it may begin transmitting chunks corresponding to those packages/versions as discussed in further detail herein. In addition, in scenarios where the DLS 110A knows that it has packages that are out of date (e.g., from a previous handshaking procedure), it may immediately request and start transfer of chunks corresponding to any more up-to-date version of packages that it requires updates for as opposed to a specific version. For example, upon entering into communication range with a subsequent computing device that does not have the version of package A that computing device 110 is looking for (version 2), but has an even more up to date version (e.g., version 4 of package A), the computing device 110 may immediately begin transfer of chunks corresponding to version 4 of package A. In some embodiments, instead of requesting chunks of any more recent version of package A, the computing device 110 may continue trying to complete the version of package A it is in the process of transferring (version 2 in this example). In still other embodiments, the requesting of chunks of a particular version can be configurable. For example, the computing device 110 may continue attempting to receive chunks for a version of the package for which it has already received some chunks for a preset amount of time, and then begin requesting chunks corresponding to any more up to date version.

Continuing the example of FIG. 2A, computing device 110 may receive 1.8 MB of chunks which may correspond to chunks 1-3 of package A version 2, and chunk 1 of package T version 3 during the time remaining in the four second transfer window after the package manifest comparison. Upon transfer of the relevant chunks, computing device 110 and 120 may terminate their connection (assuming they will no longer be in communication range of each other) and computing device 110 may continue waiting to enter communication range with another computing device from which to obtain the remainder of package A version 2 and package T version 3. It should be noted that the CFTS 110B of computing device 110 requests chunks for both package A and T, however this is not a requirement and the CFTS 110B may prioritize which package it requests chunks for as discussed in further detail herein. For example, the CFTS 110b may determine that the highest number of chunks that can be transferred during the transfer window for package A is higher than it is for package B, and may request only chunks corresponding to package A.

Referring now to FIG. 2B, at some point in time after terminating its connection with computing device 120, computing device 110 may enter into communication range with computing device 140, which may have the packages A, P, T, E, and R, including updated versions of packages A (version 2) and T (version 3). Because computing device 110 already knows that it does not have up to date versions of packages A and T, upon completing the handshaking procedure (and determining that its transfer window with computing device 140 is at or above the communication range duration threshold), it may immediately request transfer of chunks corresponding to packages A (version 2) and/or T (version 3).

In some embodiments, when the computing device 110 has multiple packages that are out of date, it may prioritize one or more packages that are closest to being fully transferred and/or can be fully transferred within the current window. In the example of FIG. 2B, instead of requesting chunks corresponding to both packages A (50% completed at this time) and T (25% completed at this time), the computing device 110 may prioritize package A because it is already 50% complete and only request chunks corresponding to package A. In this way, the computing device 110 may prevent partially completed packages from consuming memory while being unusable. Although the above example is described as prioritizing a single package, the computing device 110 may prioritize any appropriate number of out of date packages based on a variety of metrics. In some embodiments, the computing device 110 may prioritize a top percentage (e.g., a top 10%, a top 30%) of packages for which chunks will be requested based on their level of completion. In other embodiments, the computing device 110 may prioritize a set number of packages based on their level of completion (e.g., top 3 most completed packages) and/or based on which packages can be finished during the current window. In still other embodiments, the computing device 110 may prioritize packages based on their importance. For example, if package T is more crucial to the functioning of the computing device 110, then it may prioritize package T when it is requesting chunks (even if package A is further along in the transfer process). In some embodiments, the transfer of multiple chunks can be parallelized using any appropriate technique.

Figure 3:
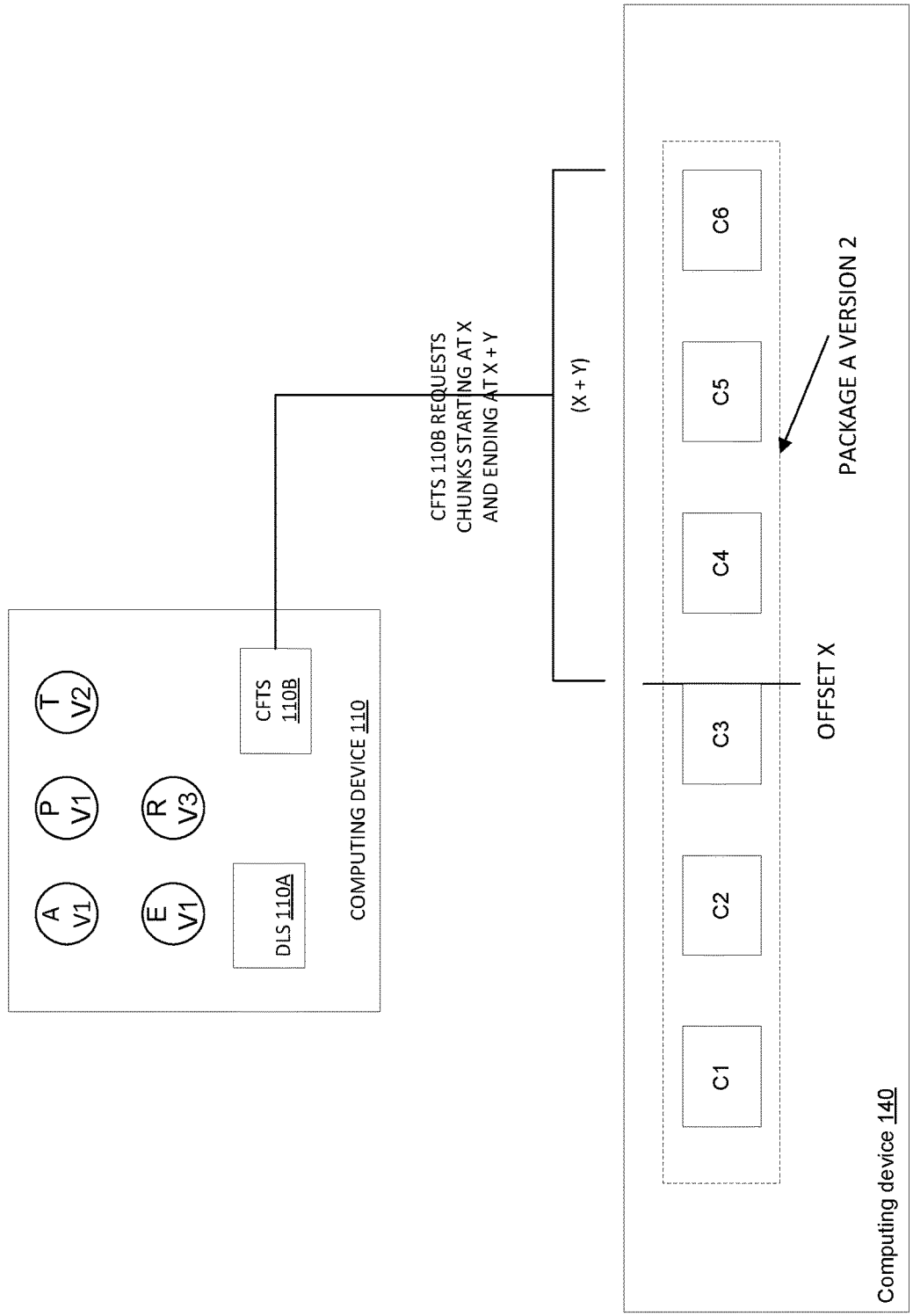
FIG. 3 is a block diagram that illustrates the requesting by a first device of chunks of a package that the first device has already received some chunks for, in accordance with some embodiments of the present disclosure.

In the example of FIG. 2B, the CFTS 110A of computing device 110 may prioritize package A because it is nearest to completion and can be completed in the current window. The CFTS 110A may determine how much of version 2 of the package A it has received, and request the next logical chunk starting at offset X, where offset X is the previous chunk that it received, which is chunk 3 as shown in FIG. 3. The CFTS 110B may determine the amount of data that can be transferred during the transfer window (with computing device 140) as discussed hereinabove and request transfer of a number of chunks (starting from offset X) that correspond to the amount of data that can be transferred during the transfer window (shown in FIG. 3 as Y). As shown in FIG. 3, the CFTS 110A may request a number of chunks corresponding to X+Y.

Referring now to FIG. 2C, at some point in time after terminating its connection with computing device 140, computing device 110 may enter into communication range with computing device 130, which may have a similar package manifest as computing device 110, except that it has a more up to date version (version 4) of package T than computing device 110. Because the DLS 110A of computing device 110 knows that it has packages that are out of date (only package T at this point), it may have the option of immediately (upon completing the handshaking procedure) requesting transfer of chunks corresponding to version 3 of package T, version 4 of package T, or waiting until it encounters another computing device with version 3 of package T which it is already in the process of transferring. If the computing device 110 (via the CFTS 110B) requests transfer of chunks corresponding to version 3 of package T, the computing device 130 may deny such a request because it does not have version 3 of package T. If the computing device 110 (via the CFTS 110B) requests transfer of chunks corresponding to version 4 of package T, it may determine how much it currently has (none), and request a number of chunks of version 4 of package T corresponding to the determined amount of data that can be transferred during the transfer window with computing device 130.

Unlike normal windowing techniques, embodiments of the present disclosure provide dynamic computation of chunk size not just based on bandwidth, but also speed and direction to determine when two computing devices will no longer be in communication range and what can be transferred before that time.

Figure 4:
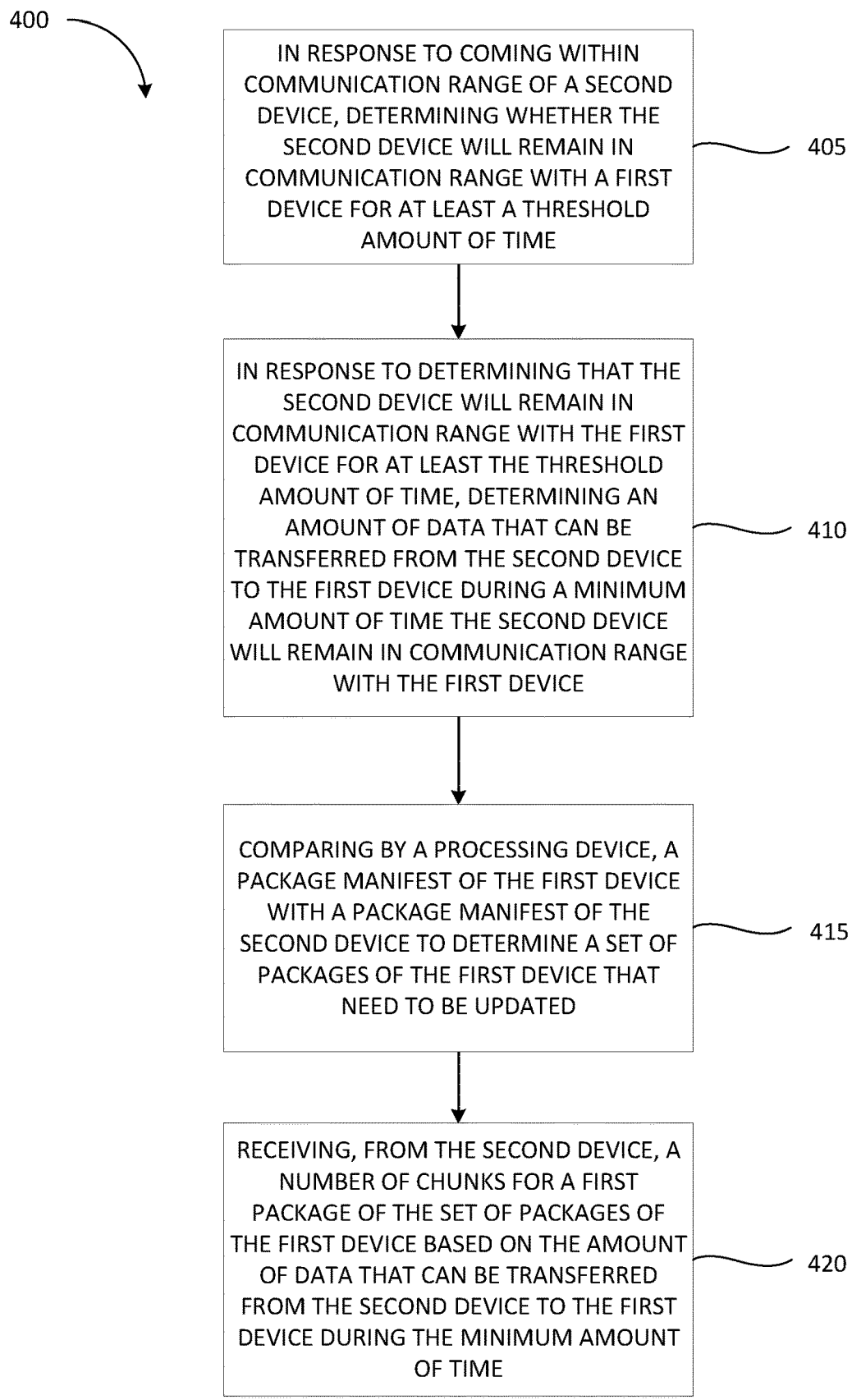
FIG. 4 is a flow diagram of a method for peer to peer chunked file transfer between two devices in motion, in accordance with some embodiments of the present disclosure.

FIG. 4 is a flow diagram of a method 400 for facilitating peer to peer chunked transfer of files between devices that are in motion, in accordance with some embodiments of the present disclosure. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400 may be performed by a computing device (e.g., computing device 110 illustrated in FIGS. 1B and 2A-2C).

Referring simultaneously to FIGS. 2A-2C, computing devices 110 and 120 may be approaching each other while driving in opposite directions on a road. FIG. 2A also illustrates the packages A, P, T, E, and R that the (host OS of) computing device 110 includes and the version number of each, as well as the packages A, P, T, E, and R that the (host OS of) computing device 120 includes and the version number of each. At block 405, as computing device 110 and 120 approach each other, they may enter communication range and execute the handshaking procedure discussed herein. More specifically, computing device 110 may inform computing device 120 that it is travelling at 10 miles per hour (MPH) in the north-east direction, and receive an indication from computing device 120 that it is travelling at 15 MPH in the south-west direction. Based on this information, the computing device 110 may determine that the minimum amount of time it will be in communication range with computing device 120 (transfer window) is four seconds. In the example of FIGS. 2A-2C, the communication range duration threshold may be 2.5 seconds, and thus computing device 110 may determine that because the transfer window exceeds the communication range duration threshold, it will be in communication range with computing device 120 for enough time to exchange an appreciable amount of data.

At block 410, the computing device 110 may then determine (via its CFTS 110A) how much data can be transferred in the four second transfer window based on the available communication bandwidth and computational bandwidth as discussed herein. With respect to communication bandwidth, the computing device 110 may share bandwidth information about each of its available communication links. In the example of FIGS. 2A-2C, the Bluetooth communication link of computing device 110 may currently be utilized for media streaming and thus may not have significant available bandwidth while the 5G link of computing device 110 may have significant available bandwidth. Thus, computing device 110 may transmit an indication that its Bluetooth link has limited bandwidth (and indicate the available bandwidth thereof), and that its 5G communication chip has significant available bandwidth (and indicate the available bandwidth thereof). Computing device 110 may receive from computing device 120 an indication that all of computing device 120's communication links (including 5G and Bluetooth) have significant available bandwidth (and the available bandwidth of each). Thus, the computing device 110 may determine that the 5G communication link is the most suitable/provides the highest bandwidth and select it for use in comparing files/transferring chunks.

The computing device 110 may also determine its computational bandwidth based on its current computational load. In the example of FIGS. 2A-2C, the computing device 110 may be currently running navigation software while also facilitating media streaming services. Thus, the computing device 110 may determine that it has fifty percent of its computational bandwidth available and may provide this information to computing device 120. Computing device 110 may also receive from computing device 120 an indication that it has one hundred percent of its computational bandwidth available. Based on the available communication bandwidth and the available computational bandwidth, the computing devices 110 and 120 may determine the amount of data that they can exchange within the four second transfer window. In the example of FIG. 2A, the computing device 110 (via CFTS 110B) may determine that it can exchange 2 megabytes (MB) of data, which is sufficient to compare its package manifest as well as receive 1.8 MB worth of chunks during the four second transfer window.

At block 415, because the DLS 110A of computing device 110 is currently unaware that it has packages that are out of date, upon determining the amount of data that can be transferred during the transfer window, computing device 110 may utilize its respective DLS 110A to compare its package manifest with the package manifest of DLS 120A and determine if any packages it is executing are not the latest version of that package. As shown in FIG. 2A, the DLS 110A may determine that it is running out of date versions of packages A and T as it is running versions 1 and 2 of those packages respectively while computing device 120 is running versions 2 and 3 of those packages respectively. In some embodiments, the DLS 110A may only compare its package manifest with that of another computing device when it is unaware that it has packages that are out of date.

It should be noted that in some scenarios, the computing device 110 may determine that it can only transfer enough data during the transfer window to compare package manifests and determine whether any packages it is running are out of date. In such scenarios, the computing device 110 (via the DLS 110A) may still compare package manifests and determine whether any packages it is running are out of date. In this way, the computing device 110 may prevent the need to perform the package manifest comparison process via it comes into communication range with a subsequent computing device (because the computing device 110 is now aware that it has packages that are out of date). For example, upon entering into communication range with a subsequent computing device, the computing device 110 (upon completing the handshaking process) may directly request the packages/versions it has determined that it requires based on its previous package manifest comparison with DLS 120A of computing device 120. In this way, the computing device 110 may dedicate all data that can be transferred (during the transfer window with that subsequent computing device) to the transfer of chunks corresponding to packages/versions that it requires.

If the subsequent computing device in question has any of the packages/versions computing device 110 requires, it may begin transmitting chunks corresponding to those packages/versions as discussed in further detail herein. In addition, in scenarios where the DLS 110A knows that it has packages that are out of date (e.g., from a previous handshaking procedure), it may immediately request and start transfer of chunks corresponding to any more up-to-date version of packages that it requires updates for as opposed to a specific version. For example, upon entering into communication range with a subsequent computing device that does not have the version of package A that computing device 110 is looking for (version 2), but has an even more up to date version (e.g., version 4 of package A), the computing device 110 may immediately begin transfer of chunks corresponding to version 4 of package A. In some embodiments, instead of requesting chunks of any more recent version of package A, the computing device 110 may continue trying to complete the version of package A it is in the process of transferring (version 2 in this example).

Continuing the example of FIG. 2A, at block 420, the computing device 110 may receive 1.8 MB of chunks which may correspond to chunks 1-3 of package A version 2, and chunk 1 of package T version 3 during the time remaining in the four second transfer window after the package manifest comparison. Upon transfer of the relevant chunks, computing device 110 and 120 may terminate their connection (assuming they will no longer be in communication range of each other) and computing device 110 may continue waiting to enter communication range with another computing device from which to obtain the remainder of package A version 2 and package T version 3. It should be noted that the CFTS 110B of computing device 110 requests chunks for both package A and T, however this is not a requirement and the CFTS 110B may prioritize which package it requests chunks for as discussed in further detail herein. For example, the CFTS 110b may determine that the highest number of chunks that can be transferred during the transfer window for package A is higher than it is for package B, and may request only chunks corresponding to package A.

In some embodiments, each of the computing devices 110 and 120 may also account for the available bandwidth of the other computing device when determining whether to proceed with further communication. For example, if computing device 110 determines that it will remain in communication range with computing device 120 for at least the communication range duration threshold amount of time, but that the available bandwidth of computing device 120 is too low to allow for exchange of an appreciable amount of data.

Figure 5:
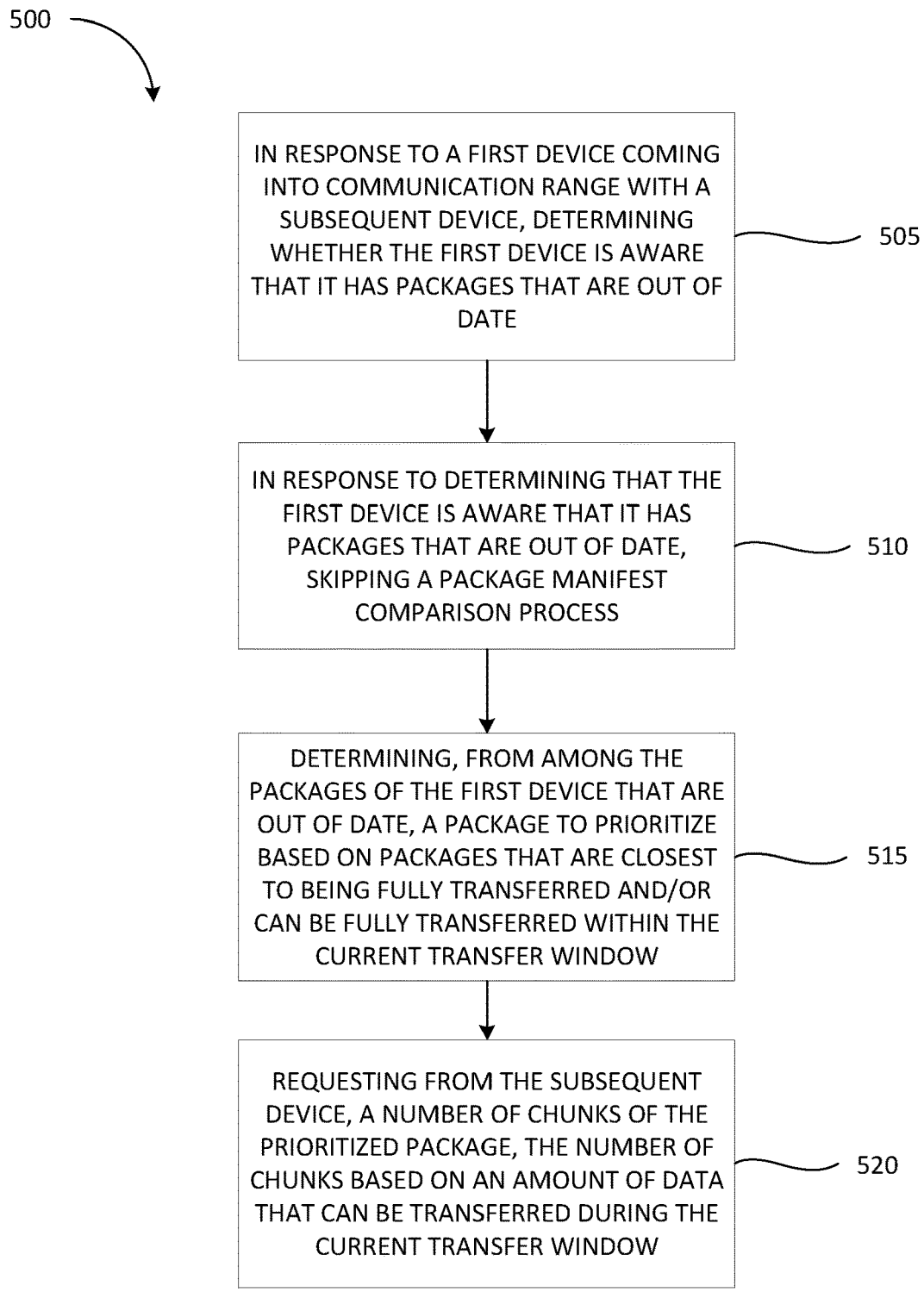
FIG. 5 is a flow diagram of a method of prioritizing packages during a peer to peer chunked file transfer between two devices in motion, in accordance with some embodiments of the present disclosure.

FIG. 5 is a flow diagram of a method 500 of prioritizing packages during peer to peer chunked transfer of packages between devices that are in motion, in accordance with some embodiments of the present disclosure. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 500 may be performed by a computing device (e.g., computing device 110 illustrated in FIGS. 2A-3).

Referring simultaneously to FIG. 2B, at some point in time after terminating its connection with computing device 120, at block 505, computing device 110 may enter into communication range with computing device 140, which may have the packages A, P, T, E, and R, including updated versions of packages A (version 2) and T (version 3). At block 510, computing device 110 may determine that it already knows that it does not have up to date versions of packages A and T and, upon completing the handshaking procedure (and determining that its transfer window with computing device 140 is at or above the communication range duration threshold), it may immediately request transfer of chunks corresponding to packages A (version 2)

and/or T (version 3) and skip performing a comparison of its package manifest with the package manifest of computing device 140.

At block 515, when the computing device 110 has multiple packages that are out of date, it may determine one or more out of date packages to prioritize based on out of date packages that are closest to being fully transferred and/or can be fully transferred within the current window. In the example of FIG. 2B, instead of requesting chunks corresponding to both packages A (50% completed at this time) and T (25% completed at this time), the computing device 110 may prioritize package A because it is already 50% complete and only request chunks corresponding to package A. In this way, the computing device 110 may prevent partially completed packages from consuming memory while being unusable. Although the above example is described as prioritizing a single package, the computing device 110 may prioritize any appropriate number of out of date packages based on a variety of metrics. In some embodiments, the computing device 110 may prioritize a top percentage (e.g., a top 10%, a top 30%) of packages for which chunks will be requested based on their level of completion. In other embodiments, the computing device 110 may prioritize a set number of packages based on their level of completion (e.g., top 3 most completed packages) and/or based on which packages can be finished during the current window. In still other embodiments, the computing device 110 may prioritize packages based on their importance. For example, if package T is more crucial to the functioning of the computing device 110, then it may prioritize package T when it is requesting chunks (even if package A is further along in the transfer process).

In the example of FIG. 2B, the CFTS 110A of computing device 110 may prioritize package A because it is nearest to completion and can be completed in the current window. The CFTS 110A may determine how much of version 2 of the package A it has received, and request the next logical chunk starting at offset X, where offset X is the previous chunk that it received, which is chunk 3 as shown in FIG. 3. The CFTS 110B may determine the amount of data that can be transferred during the transfer window (with computing device 140) as discussed hereinabove and request transfer of a number of chunks (starting from offset X) that correspond to the amount of data that can be transferred during the transfer window (shown in FIG. 3 as Y). As shown in FIG. 3, the CFTS 110A may request a number of chunks corresponding to X+Y.

Figure 6:
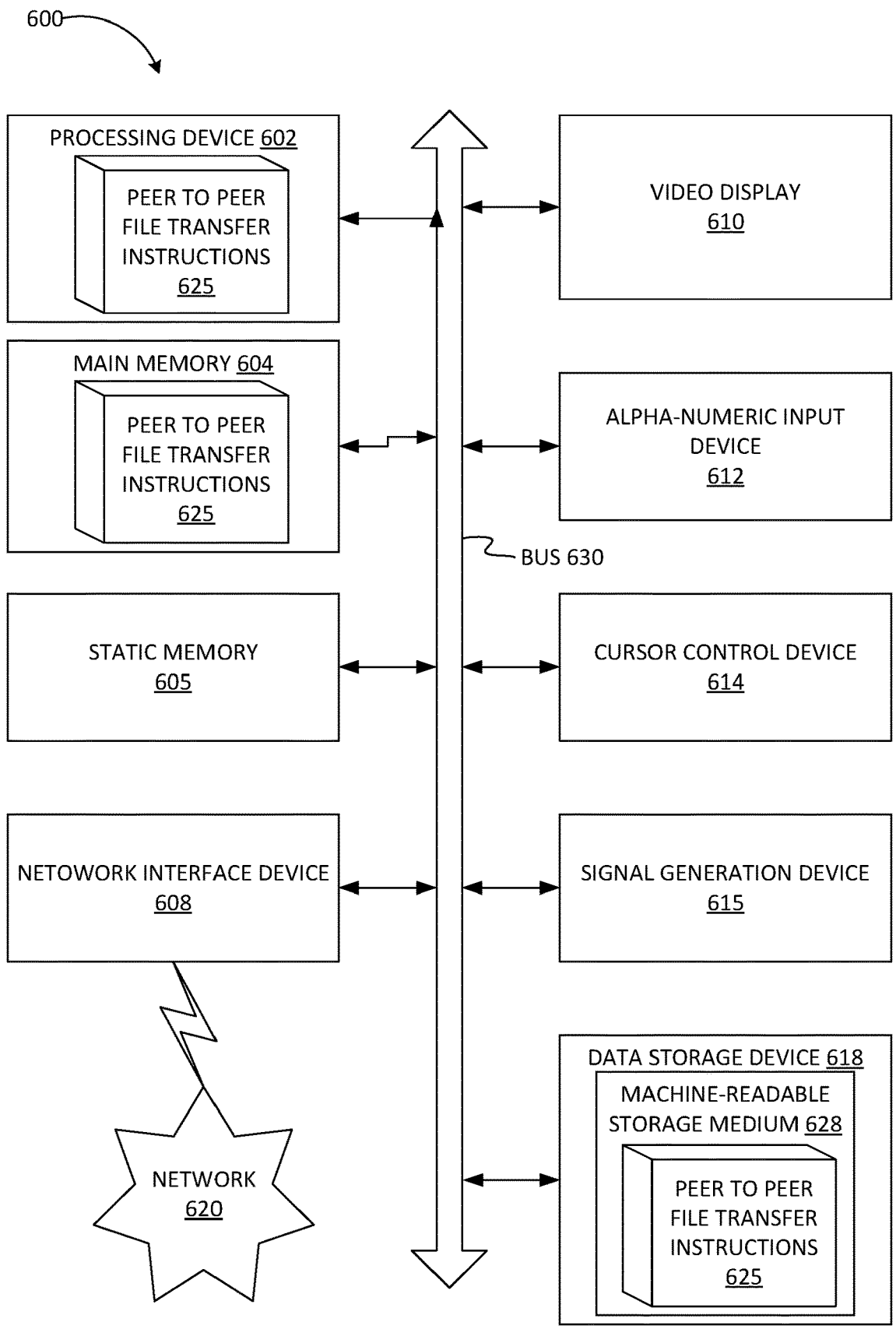
FIG. 6 is a block diagram of an example computing device that may perform one or more of the operations described herein, in accordance with some embodiments of the present disclosure.

FIG. 6 illustrates a diagrammatic representation of a machine in the example form of a computer system 600 within which a set of instructions, for causing the machine to perform any one or more of the methodologies discussed herein for generating delta-differences for packages on an on-demand basis.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 600 may be representative of a server.

The exemplary computer system 600 includes a processing device 602, a main memory 604 (e.g., read-only memory (ROM), flash memory, dynamic random access memory (DRAM), a static memory 606 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute peer to peer file transfer instructions 625, for performing the operations and steps discussed herein.

The data storage device 618 may include a machine-readable storage medium 628, on which is stored one or more sets of peer to peer file transfer instructions 625 (e.g., software) embodying any one or more of the methodologies of functions described herein. The peer to peer file transfer instructions 625 may also reside, completely or at least partially, within the main memory 604 or within the processing device 602 during execution thereof by the computer system 600; the main memory 604 and the processing device 602 also constituting machine-readable storage media. The peer to peer file transfer instructions 625 may further be transmitted or received over a network 620 via the network interface device 608.

The machine-readable storage medium 628 may also be used to store instructions to perform a method for object analysis/validation event publishing, as described herein. While the machine-readable storage medium 628 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Example 1 is a method comprising: in response to coming within communication range of a second device, determining whether the second device will remain in communication range with a first device for at least a threshold amount of time; in response to determining that the second device will remain in communication range with the first device for at least the threshold amount of time, determining an amount of data that can be transferred from the second device to the first device during a transfer window with the second device; comparing, by a processing device, a package manifest of the first device with a package manifest of the second device to determine a set of packages of the first device that need to be updated; and receiving, from the second device, a number of chunks for a first package of the set of packages of the first device based on the amount of data that can be transferred from the second device to the first device during the transfer window with the second device.

Example 2 is the method of example 1, wherein the transfer window with the second device corresponds to a minimum amount of time the second device will remain in communication range with the first device, the method further comprising: determining as the first package, the package among the set of packages for which a highest number of chunks can be transferred during the transfer window with the second device; and requesting from the second device the number of chunks for the first package based on the amount of data that can be transferred from the second device to the first device during the transfer window with the second device.

Example 3 is the method of example 1, further comprising: determining the transfer window with the second device based on a speed of each of the first and second device and a direction in which each of the first and second device is moving.

Example 4 is the method of example 3, wherein the amount of data that can be transferred from the second device to the first device during the transfer window with the second device is determined based on an available communication bandwidth of each of the first and second devices and an available computational bandwidth of each of the first and second devices.

Example 5 is the method of example 4, further comprising: determining the available communication bandwidth of each of the first and second device based on a highest bandwidth communication link available for each of the first and second devices; and determining the available computational bandwidth of each of the first and second devices based on a current computational load of each of the first and second devices.

Example 6 is the method of example 1, further comprising: in response to coming within communication range of a third device, determining whether the third device will remain in communication range with the first device for at least the threshold amount of time; and in response to determining that the third device will remain in communication range with the first device for at least the threshold amount of time: determining a previous chunk received for the first package; and requesting from the third device an additional number of chunks of the first package based on the previous chunk received and an amount of data that can be transferred from the third device to the first device during a minimum amount of time the third device will remain in communication range with the first device.

Example 7 is the method of example 1, wherein determining the amount of data that can be transferred from the second device to the first device during the minimum amount of time is performed using a chunked file transfer service (CFTS).

Example 8 is a system comprising: a memory; and a processing device, operatively coupled to the memory, the processing device to: in response to coming within communication range of a second device, determine whether the second device will remain in communication range with a first device for at least a threshold amount of time; in response to determining that the second device will remain in communication range with the first device for at least the threshold amount of time, determine an amount of data that can be transferred from the second device to the first device during a transfer window with the second device; compare a package manifest of the first device with a package manifest of the second device to determine a set of packages of the first device that need to be updated; and receive, from the second device, a number of chunks for a first package of the set of packages of the first device based on the amount of data that can be transferred from the second device to the first device during the transfer window with the second device.

Example 9 is the system of example 8, wherein the transfer window with the second device corresponds to a minimum amount of time the second device will remain in communication range with the first device, and wherein the processing device is further to: determine as the first package, the package among the set of packages for which a highest number of chunks can be transferred during the transfer window with the second device; and request from the second device the number of chunks for the first package based on the amount of data that can be transferred from the second device to the first device during the transfer window with the second device.

Example 10 is the system of example 8, wherein the processing device is further to: determine the transfer window with the second device based on a speed of each of the first and second device and a direction in which each of the first and second device is moving.

Example 11 is the system of example 10, wherein the processing device determines the amount of data that can be transferred from the second device to the first device during the transfer window with the second device based on an available communication bandwidth of each of the first and second devices and an available computational bandwidth of each of the first and second devices.

Example 12 is the system of example 11, wherein the processing device is further to: determine the available communication bandwidth of each of the first and second device based on a highest bandwidth communication link available for each of the first and second devices; and determine the available computational bandwidth of each of the first and second devices based on a current computational load of each of the first and second devices.

Example 13 is the system of example 8, wherein the processing device is further to: in response to coming within communication range of a third device, determine whether the third device will remain in communication range with the first device for at least the threshold amount of time; and in response to determining that the third device will remain in communication range with the first device for at least the threshold amount of time: determine a previous chunk received for the first package; and request from the third device an additional number of chunks of the first package based on the previous chunk received and an amount of data that can be transferred from the third device to the first device during a minimum amount of time the third device will remain in communication range with the first device.

Example 14 is the system of example 8, wherein the processing devices determines the amount of data that can be transferred from the second device to the first device during the minimum amount of time using a chunked file transfer service (CFTS).

Example 15 is a non-transitory computer-readable medium having instructions stored thereon which, when executed by a processing device, cause the processing device to: in response to coming within communication range of a second device, determine whether the second device will remain in communication range with a first device for at least a threshold amount of time; in response to determining that the second device will remain in communication range with the first device for at least the threshold amount of time, determine an amount of data that can be transferred from the second device to the first device during a transfer window with the second device; compare by the processing device, a package manifest of the first device with a package manifest of the second device to determine a set of packages of the first device that need to be updated; and receive, from the second device, a number of chunks for a first package of the set of packages of the first device based on the amount of data that can be transferred from the second device to the first device during the transfer window with the second device.

Example 16 is the non-transitory computer-readable medium of claim 15, wherein the transfer window with the second device corresponds to a minimum amount of time the second device will remain in communication range with the first device, and wherein the processing device is further to: determine as the first package, the package among the set of packages for which a highest number of chunks can be transferred during the transfer window with the second device; and request from the second device the number of chunks for the first package based on the amount of data that can be transferred from the second device to the first device during the transfer window with the second device.

Example 17 is the non-transitory computer-readable medium of claim 15, wherein the processing device is further to: determine the transfer window with the second device based on a speed of each of the first and second device and a direction in which each of the first and second device is moving.

Example 18 is the non-transitory computer-readable medium of claim 17, wherein the processing device determines the amount of data that can be transferred from the second device to the first device during the transfer window with the second device based on an available communication bandwidth of each of the first and second devices and an available computational bandwidth of each of the first and second devices.

Example 19 is the non-transitory computer-readable medium of claim 18, wherein the processing device is further to: determine the available communication bandwidth of each of the first and second device based on a highest bandwidth communication link available for each of the first and second devices; and determine the available computational bandwidth of each of the first and second devices based on a current computational load of each of the first and second devices.

Example 20 is the non-transitory computer-readable medium of claim 15, wherein the processing device is further to: in response to coming within communication range of a third device, determine whether the third device will remain in communication range with the first device for at least the threshold amount of time; and in response to determining that the third device will remain in communication range with the first device for at least the threshold amount of time: determine a previous chunk received for the first package; and request from the third device an additional number of chunks of the first package based on the previous chunk received and an amount of data that can be transferred from the third device to the first device during a minimum amount of time the third device will remain in communication range with the first device.

Example 21 is the non-transitory computer-readable medium of claim 15, wherein the processing device determines the amount of data that can be transferred from the second device to the first device during the minimum amount of time using a chunked file transfer service (CFTS).

Example 22 is a system comprising: a memory; and a processing device operatively coupled to the memory, the processing device to: in response to coming within communication range of a second device, determine a minimum amount of time that the second device will remain in communication range with a first device; in response to determining that the minimum amount of time is equal to or greater than a threshold amount of time, determine a set of packages of the first device that are out of date; determine an amount of data that can be transferred from the second device to the first device during the minimum amount of time; and receive from the second device a number of chunks for each of one or more of the set of packages of the first device.

Example 23 is the system of example 22, wherein the processing device is further to: in response to determining that the minimum amount of time is not equal to or greater than the threshold amount of time, terminate communication with the second device.

Example 24 is the system of example 22, wherein to determine the set of packages of the first device that are out of date, the processing device is to: compare a package manifest of the first device with a package manifest of the second device; identify packages that are common to the first device and the second device; and for each of the packages that are common to the first device and the second device, determine whether there is a difference in a version of the package executing on the first device and a version of the package executing on the second device.

Example 25 is the system of example 22, wherein to determine the amount of data that can be transferred from the second device to the first device during the minimum amount of time, the processing device is to: determine an available communication bandwidth of each of the first and second device based on a highest bandwidth communication link available for each of the first and second devices; determine an available computational bandwidth of each of the first and second devices based on a current computational load of each of the first and second devices; and determine the amount of data that can be transferred from the second device to the first device during the minimum amount of time based on the available computational bandwidth and the available communication bandwidth.

Example 26 is the system of example 22, wherein the processing device is further to: in response to coming within communication range of a third device, determine whether a minimum amount of time that the third device will remain in communication range with the first device exceeds the threshold amount of time; in response to determining that the minimum amount of time that the third device will remain in communication range with the first device exceeds the threshold amount of time, determine a previous chunk received for each of the one or more of the set of packages of the first device; and request from the third device an additional number of chunks of each of the one or more of the set of packages of the first device based on the previous chunk received and an amount of data that can be transferred from the third device to the first device during the minimum amount of time the third device will remain in communication range with the first device.

Example 27 is the system of example 26, wherein the processing device is further to: determine as the one or more of the set of packages of the first device, packages among the set of packages for which a highest number of chunks can be transferred during the minimum amount of time the third device will remain in communication range with the first device.

Example 28 is the system of example 22, wherein to determine the amount of data that can be transferred from the second device to the first device during the minimum amount of time, the processing device is to utilize a chunked file transfer service (CFTS).

Example 29 is a method comprising: in response to coming within communication range of a second device, determining a minimum amount of time that the second device will remain in communication range with a first device; in response to determining that the minimum amount of time is equal to or greater than a threshold amount of time, determining a set of packages of the first device that are out of date; determining an amount of data that can be transferred from the second device to the first device during the minimum amount of time; and receiving from the second device a number of chunks for each of one or more of the set of packages of the first device.

Example 30 is the method of example 29, further comprising: in response to determining that the minimum amount of time is not equal to or greater than the threshold amount of time, terminating communication with the second device.

Example 31 is the method of example 29, wherein determining the set of packages of the first device that are out of date comprises: comparing a package manifest of the first device with a package manifest of the second device; identifying packages that are common to the first device and the second device; and for each of the packages that are common to the first device and the second device, determining whether there is a difference in a version of the package executing on the first device and a version of the package executing on the second device.

Example 32 is the method of example 29, wherein determining the amount of data that can be transferred from the second device to the first device during the minimum amount of time comprises: determining an available communication bandwidth of each of the first and second device based on a highest bandwidth communication link available for each of the first and second devices; determining an available computational bandwidth of each of the first and second devices based on a current computational load of each of the first and second devices; and determining the amount of data that can be transferred from the second device to the first device during the minimum amount of time based on the available computational bandwidth and the available communication bandwidth.

Example 33 is the method of example 29, further comprising: in response to coming within communication range of a third device, determining whether a minimum amount of time that the third device will remain in communication range with the first device exceeds the threshold amount of time; in response to determining that the minimum amount of time that the third device will remain in communication range with the first device exceeds the threshold amount of time, determining a previous chunk received for each of the one or more of the set of packages of the first device; and requesting from the third device an additional number of chunks of each of the one or more of the set of packages of the first device based on the previous chunk received and an amount of data that can be transferred from the third device to the first device during the minimum amount of time the third device will remain in communication range with the first device.

Example 34 is the method of example 33, further comprising: wherein the processing device is further to: determine as the one or more of the set of packages of the first device, packages among the set of packages for which a highest number of chunks can be transferred during the minimum amount of time the third device will remain in communication range with the first device.

Example 35 is the method of example 29, wherein determining the amount of data that can be transferred from the second device to the first device during the minimum amount of time is performed using a chunked file transfer service (CFTS).

Example 36 is an apparatus comprising: means for in response to coming within communication range of a second device, determining whether the second device will remain in communication range with a first device for at least a threshold amount of time; means for in response to determining that the second device will remain in communication range with the first device for at least the threshold amount of time, determining an amount of data that can be transferred from the second device to the first device during a transfer window with the second device; means for comparing a package manifest of the first device with a package manifest of the second device to determine a set of packages of the first device that need to be updated; and means for receiving, from the second device, a number of chunks for a first package of the set of packages of the first device based on the amount of data that can be transferred from the second device to the first device during the transfer window with the second device.

Example 37 is the apparatus of example 36, wherein the transfer window with the second device corresponds to a minimum amount of time the second device will remain in communication range with the first device, the apparatus further comprising: means for determining as the first package, the package among the set of packages for which a highest number of chunks can be transferred during the transfer window with the second device; and means for requesting from the second device the number of chunks for the first package based on the amount of data that can be transferred from the second device to the first device during the transfer window with the second device.

Example 38 is the apparatus of example 36, further comprising: means for determining the transfer window with the second device based on a speed of each of the first and second device and a direction in which each of the first and second device is moving.

Example 39 is the apparatus of example 38, wherein the amount of data that can be transferred from the second device to the first device during the transfer window with the second device is determined based on an available communication bandwidth of each of the first and second devices and an available computational bandwidth of each of the first and second devices.

Example 40 is the apparatus of example 39, further comprising: means for determining the available communication bandwidth of each of the first and second device based on a highest bandwidth communication link available for each of the first and second devices; and means for determining the available computational bandwidth of each of the first and second devices based on a current computational load of each of the first and second devices.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof.

What is claimed is:

1. A method comprising:
   in response to coming within communication range of a second device, determining by a first device, whether the second device will remain in communication range with the first device for at least a threshold amount of time based on a speed and direction of the first device and the second device, wherein the first and second devices are part of a domain;
   in response to determining that the second device will remain in communication range with the first device for at least the threshold amount of time, determining an amount of data that can be transferred from the second device to the first device during a transfer window with the second device;
   comparing, by a processing device, a package manifest of the first device with a package manifest of the second device to determine a set of packages of the first device that need to be updated; and
   receiving, from the second device, a number of chunks for a first package of the set of packages of the first device based on the amount of data that can be transferred from the second device to the first device during the transfer window with the second device.

2. The method of claim 1, wherein the transfer window with the second device corresponds to a minimum amount of time the second device will remain in communication range with the first device, the method further comprising:
   determining as the first package, the package among the set of packages for which a highest number of chunks can be transferred during the transfer window with the second device; and
   requesting from the second device the number of chunks for the first package based on the amount of data that can be transferred from the second device to the first device during the transfer window with the second device.

3. The method of claim 1, further comprising:
   determining the transfer window with the second device based on a speed of each of the first and second device and a direction in which each of the first and second device is moving.

4. The method of claim 3, wherein the amount of data that can be transferred from the second device to the first device during the transfer window with the second device is determined based on an available communication bandwidth of each of the first and second devices and an available computational bandwidth of each of the first and second devices.

5. The method of claim 4, further comprising:
determining the available communication bandwidth of each of the first and second device based on a highest bandwidth communication link available for each of the first and second devices; and
determining the available computational bandwidth of each of the first and second devices based on a current computational load of each of the first and second devices.

6. The method of claim 1, further comprising:
in response to coming within communication range of a third device, determining whether the third device will remain in communication range with the first device for at least the threshold amount of time; and
in response to determining that the third device will remain in communication range with the first device for at least the threshold amount of time:
determining a previous chunk received for the first package; and
requesting from the third device an additional number of chunks of the first package based on the previous chunk received and an amount of data that can be transferred from the third device to the first device during a minimum amount of time the third device will remain in communication range with the first device.

7. The method of claim 1, wherein determining the amount of data that can be transferred from the second device to the first device during the minimum amount of time is performed using a chunked file transfer service (CFTS).

8. A system comprising:
a memory; and
a processing device operatively coupled to the memory, the processing device to:
in response to a first device that the processing device is part of coming within communication range of a second device, determine a minimum amount of time that the second device will remain in communication range with the first device based on a speed and direction of the first device and the second device, wherein the first and second devices are part of a domain;
in response to determining that the minimum amount of time is equal to or greater than a threshold amount of time, determine a set of packages of the first device that are out of date;
determine an amount of data that can be transferred from the second device to the first device during the minimum amount of time; and
receive from the second device a number of chunks for each of one or more of the set of packages of the first device.

9. The system of claim 8, wherein the processing device is further to:
in response to determining that the minimum amount of time is not equal to or greater than the threshold amount of time, terminate communication with the second device.

10. The system of claim 8, wherein to determine the set of packages of the first device that are out of date, the processing device is to:

compare a package manifest of the first device with a package manifest of the second device;
identify packages that are common to the first device and the second device; and
for each of the packages that are common to the first device and the second device, determine whether there is a difference in a version of the package executing on the first device and a version of the package executing on the second device.

11. The system of claim 8, wherein to determine the amount of data that can be transferred from the second device to the first device during the minimum amount of time, the processing device is to:
determine an available communication bandwidth of each of the first and second device based on a highest bandwidth communication link available for each of the first and second devices;
determine an available computational bandwidth of each of the first and second devices based on a current computational load of each of the first and second devices; and
determine the amount of data that can be transferred from the second device to the first device during the minimum amount of time based on the available computational bandwidth and the available communication bandwidth.

12. The system of claim 8, wherein the processing device is further to:
in response to coming within communication range of a third device, determine whether a minimum amount of time that the third device will remain in communication range with the first device exceeds the threshold amount of time;
in response to determining that the minimum amount of time that the third device will remain in communication range with the first device exceeds the threshold amount of time, determine a previous chunk received for each of the one or more of the set of packages of the first device; and
request from the third device an additional number of chunks of each of the one or more of the set of packages of the first device based on the previous chunk received and an amount of data that can be transferred from the third device to the first device during the minimum amount of time the third device will remain in communication range with the first device.

13. The system of claim 12, wherein the processing device is further to:
determine as the one or more of the set of packages of the first device, packages among the set of packages for which a highest number of chunks can be transferred during the minimum amount of time the third device will remain in communication range with the first device.

14. The system of claim 8, wherein to determine the amount of data that can be transferred from the second device to the first device during the minimum amount of time, the processing device is to utilize a chunked file transfer service (CFTS).

15. A non-transitory computer-readable medium having instructions stored thereon which, when executed by a processing device, cause the processing device to:
in response to a first device that the processing device is a part of coming within communication range of a second device, determine whether the second device will remain in communication range with the first device for at least a threshold amount of time based on a speed and direction of the first device and the second device, wherein the first and second devices are part of a domain;

in response to determining that the second device will remain in communication range with the first device for at least the threshold amount of time, determine an amount of data that can be transferred from the second device to the first device during a transfer window with the second device;

compare, by the processing device, a package manifest of the first device with a package manifest of the second device to determine a set of packages of the first device that need to be updated; and receive, from the second device, a number of chunks for a first package of the set of packages of the first device based on the amount of data that can be transferred from the second device to the first device during the transfer window with the second device.

16. The non-transitory computer-readable medium of claim 15, wherein the transfer window with the second device corresponds to a minimum amount of time the second device will remain in communication range with the first device, and wherein the processing device is further to:

determine as the first package, the package among the set of packages for which a highest number of chunks can be transferred during the transfer window with the second device; and request from the second device the number of chunks for the first package based on the amount of data that can be transferred from the second device to the first device during the transfer window with the second device.

17. The non-transitory computer-readable medium of claim 15, wherein the processing device is further to:

determine the transfer window with the second device based on a speed of each of the first and second device and a direction in which each of the first and second device is moving.

18. The non-transitory computer-readable medium of claim 17, wherein the processing device determines the amount of data that can be transferred from the second device to the first device during the transfer window with the second device based on an available communication bandwidth of each of the first and second devices and an available computational bandwidth of each of the first and second devices.

19. The non-transitory computer-readable medium of claim 18, wherein the processing device is further to:

determine the available communication bandwidth of each of the first and second device based on a highest bandwidth communication link available for each of the first and second devices; and determine the available computational bandwidth of each of the first and second devices based on a current computational load of each of the first and second devices.

20. The non-transitory computer-readable medium of claim 15, wherein the processing device is further to:

in response to coming within communication range of a third device, determine whether the third device will remain in communication range with the first device for at least the threshold amount of time; and in response to determining that the third device will remain in communication range with the first device for at least the threshold amount of time:

determine a previous chunk received for the first package; and request from the third device an additional number of chunks of the first package based on the previous chunk received and an amount of data that can be transferred from the third device to the first device during a minimum amount of time the third device will remain in communication range with the first device.

* * * * *